United States Patent [19]

Andersen

[11] Patent Number: 5,928,773
[45] Date of Patent: Jul. 27, 1999

[54] FOAMED GLASS ARTICLES AND METHODS OF MAKING SAME AND METHODS OF CONTROLLING THE PH OF SAME WITHIN SPECIFIC LIMITS

[75] Inventor: James C. Andersen, La Crosse, Wis.

[73] Assignee: Vitric Corporation, La Crosse, Wis.

[21] Appl. No.: 08/736,141

[22] Filed: Oct. 28, 1996

Related U.S. Application Data

[63] Continuation-in-part of application No. 08/196,632, Feb. 15, 1994, abandoned.

[51] Int. Cl.[6] .............................. B28B 1/50; C03B 19/08; C03C 11/00
[52] U.S. Cl. .......................... 428/305.5; 51/296; 51/308; 51/309; 65/17.6; 65/22; 264/44; 264/661; 264/670; 264/681; 428/312.6; 428/313.9; 428/317.1; 428/317.9; 501/32; 501/39; 501/84
[58] Field of Search .................... 51/293, 296, 307–309; 428/312.6, 313.9, 317.1, 305.5, 317.7, 317.9; 501/11, 17, 32, 39, 84; 65/17.6, 22; 264/44, 661, 670, 681

[56] References Cited

U.S. PATENT DOCUMENTS

| | | |
|---|---|---|
| 2,233,608 | 3/1941 | Haux et al. . |
| 2,691,248 | 10/1954 | Ford . |
| 2,987,411 | 6/1961 | Minnick . |
| 2,992,930 | 7/1961 | Wheeler et al. . |
| 3,207,588 | 9/1965 | Slayter et al. . |
| 3,325,341 | 6/1967 | Shannon . |
| 3,331,694 | 7/1967 | Heidrich et al. . |
| 3,459,630 | 8/1969 | D'Eustachio et al. .................. 428/178 |
| 3,585,014 | 6/1971 | Malesak . |
| 3,744,984 | 7/1973 | Sato . |
| 3,874,861 | 4/1975 | Kurz . |
| 3,945,816 | 3/1976 | Johnson . |
| 3,963,503 | 6/1976 | Mackenzie . |
| 4,038,063 | 7/1977 | Williams et al. . |
| 4,124,365 | 11/1978 | Williams et al. . |
| 4,198,224 | 4/1980 | Kirkpatrick . |
| 4,207,114 | 6/1980 | Schuster et al. . |
| 4,225,443 | 9/1980 | Harris et al. ............................ 210/510 |
| 4,347,326 | 8/1982 | Iwami et al. . |
| 4,430,107 | 2/1984 | Dennert et al. . |
| 4,734,322 | 3/1988 | Favre . |
| 4,826,788 | 5/1989 | Dennert et al. . |
| 4,933,306 | 6/1990 | Pietsch . |
| 5,049,333 | 9/1991 | Wolfe et al. . |
| 5,266,087 | 11/1993 | Oat . |
| 5,326,382 | 7/1994 | Oat . |
| 5,359,745 | 11/1994 | Oat . |

FOREIGN PATENT DOCUMENTS

| | | | |
|---|---|---|---|
| 58-190828 | 11/1983 | Japan | .................................. 428/312.6 |

OTHER PUBLICATIONS

CRC Handbook of Chemistry and Physics, 66th Edition, p. D–146, 1986.
Material Safety Data Sheet fro Barium Sulfate.

*Primary Examiner*—Blaine Copenheaver
*Attorney, Agent, or Firm*—Patula & Associates

[57] ABSTRACT

A neutral pH foamed glass article is produced from a mixture of pulverized glass particles, foaming agent, binder, and water, wherein the glass article is heated to remove excess moisture and organic materals, then further heated to cause the foaming agent to emit a foaming gas, thereby causing foaming of the glass article. The foamed glass article is annealed in a controlled cooling fashion to avoid thermal stress, cracking and devitrification. The foamed glass articles may be used as artificial pumice stones in the stone-washed garment industry. Preferably, the mixture contains an amount of lignosulfonate to produce foamed glass having substantially neutral pH values in a range of from about 7.0 to 8.4.

68 Claims, No Drawings

FOAMED GLASS ARTICLES AND METHODS OF MAKING SAME AND METHODS OF CONTROLLING THE PH OF SAME WITHIN SPECIFIC LIMITS

This is a Continuation-In-Part of U.S. patent application Ser. No. 08/196,632 filed Feb. 15, 1994, now abandoned.

FIELD OF THE INVENTION

This invention relates to foamed glass articles and methods of making them. More specifically, this invention relates to methods of producing a substantially neutral pH foamed glass article within pH limits of about 7.0 to 8.4 pH, by means of specialized foaming and cooling processes and specialized materials, especially suited for industrial process stone washing of garments.

BACKGROUND OF THE INVENTION

It has been desirable in the art to develop economical, marketable by-products of waste glass which can be manufactured by efficient and cost effective processes. One such by-product is "foamed glass" which is well known in the art. See, e.g., U.S. Pat. No. 3,874,861 of Kurz, the teachings of which are incorporated specifically herein by reference. One of the many uses for foamed glass is in the stone-washed garment industry, wherein a foamed glass article can be used in place of natural pumice to obtain a very desirable "stone-washed" look for denim, silk, and other textile products.

The known art of foaming glass teaches a variety of methods and compounds for improving foamed glass and related products. In U.S. Pat. No. 4,207,114 (Schuster), for example, a foamed glass product and method are disclosed having fire-resistant and fluid permeability properties achieved through controlled foaming. U.S. Pat. No. 3,207,588 (Slayter) teaches a glass foam having improved insulating properties by using finely meshed glass to produce finer and more uniform foamed glass cells, and a more lightweight foamed glass. Other art discloses alternate methods for foaming glass, primarily for use in the construction industry as, for example, in U.S. Pat. Nos. 2,987,441 (Minnick), 2,691,248 (Ford), 4,347,326 (Iwami) and 4,826,788 (Dennert). Other art teaches preferred apparatuses for manufacturing foamed glass, such as in U.S. Pat. Nos. 5,049,333 (Wolfe), 4,038,063 (Williams) and 4,124,365 (Williams).

The present invention, however, is not directed toward the construction or insulating industries but, rather, the garment stone-washing industry. The ability of foamed glass used in stone-washing to insulate, for example, is not relevant. Other art has focused on stone-washing garments. U.S. Pat. No. 4,933,306 to Pietsch teaches an improved artificial pumice stone for use in the garment industry. The focus of Pietsch is on decreasing abrasivity of the articial pumice and increasing mechanical strength to enhance the use of cellular glass in the garment industry. Similarly, U.S. Patents to Oat, U.S. Pat. Nos. 5,266,087, 5,326,383 and 5,359,745 disclose improvements in the prior art related to foamed glass in the garment industry as a function of improving product attrition rates and abrasiveness. The focus of the present invention is on neutralizing pH of foamed glass to diminish or prevent interference with enzyme activity in the garment stone washing process, not on affecting foamed glass product abrasiveness. U.S. Pat. No. 4,308,065 (Walls-Muycelo) does address pH levels, but in the construction industry, not the foamed glass industry. U.S. Pat. No. 4,308,065 also acknowledges that, conventionally, highly alkaline products are used in the expanded aggregates industry. The chemical processes disclosed and components used in U.S. Pat. No. 4,308,065 are completely different than those of the present invention.

Generally, foamed glass is made by finely pulverizing glass particles and thoroughly mixing with the pulverized glass particles an amount of foaming agent, binder and water to produce a glass particle mixture. The glass particle mixture is formed into a glass article of the desired size and shape and heated for a time to a temperature above the softening point of the glass to cause the glass particles to fuse to one another and substantially all the remaining foaming agent to emit foaming gas emissions, thereby causing cellulation or foaming. The heated foamed glass article then is cooled to produce the finished foamed glass article.

A commonly used foaming agent of choice in prior art is calcium carbonate ($CaCO_3$). A glass and $CaCO_3$ mixture having a content of about 0.01% to 28% $CaCO_3$ has been found previously to produce a foamed glass article satisfactory for the stone washing of garments, except that a foamed glass article formed with an excess of 5% by weight $CaCO_3$ tends to have a high pH, that is, it is alkaline or basic. It has been determined that a high pH foamed glass article is undesirable for stone-washing garments. One reason for this is that high pH foamed glass interferes with enzymes now used more and more frequently in garment stone-washing. Therefore, the alkaline foamed glass articles found in prior art generally are not suitable where certain desirable enzymatic additives are used in the stone washing process. As the use of pH sensitive enzymes is increasing in the stone washing industry, there thus exists a need in the art for a substantially neutral pH foamed glass article, within the pH range of 7.0 to 8.4.

The residue produced by the wearing away of foamed glass stones is of substantially higher quality than the sludge produced in connection with natural pumice. Pumice sludge is useless and must be disposed of in a landfill at substantial cost to the user. Foamed glass residue, on the other hand, once separated from the garment processing waste stream, is virtually 100% glass, and a substantial amount of this glass can be re-used in the manufacture of other foamed glass articles, and for other foamed glass uses, such as in the construction industry.

A foamed glass article described herein can be made almost totally from mixed color waste glass cullet, for which in most parts of the country there is a limited market. The methods disclosed and claimed herein make a major contribution towards recycling efforts and to the environmental improvement of the nation. The use of a foamed glass article of the present invention will substantially completely eliminate the need of strip-mining of natural pumice deposits worldwide. It also appears that it may be possible to produce a foamed glass article at less expense than the cost of producing pumice stones from natural pumice, which includes mining, crushing, screening, and very large transportation costs. This may result in economies to the stone-washing companies and lower prices for consumers.

One object of the present invention is to provide an improved foamed glass process and product which is substantially pH neutral for use in the garment stone-washing industry.

Another object of the present invention therefore is to provide an improved foamed glass process and product for garment industry uses which is substantially pH neutral and has a low attrition rate.

Another object of the present invention is to provide an inexpensive, environmentally sound, efficient process for manufacturing substantially pH neutral foamed glass.

SUMMARY OF THE INVENTION

The foregoing objects are achieved and problems solved by methods of producing substantially pH neutral foamed glass from glass particles within a pH range of 7.0 to 8.4 pH, in accordance with the present invention.

In the presently preferred form of the invention, the desired pH values are obtained by using a glass mixture containing lignosulfonate, which has been found to produce a controllable foaming effect yet does not result in a high pH in the final product. While in some instances lignosulfonate can be used in combination with other foaming agents, for example, with a small amount of $CaCO_3$, thereby to reduce the excessive alkalinity normally produced by higher amounts of $CaCO_3$, it can be used as the sole foaming agent to produce excellent foaming and a nearly neutral pH of about 7.2, as an example.

A lower pH foamed glass article also can be produced, at least to some degree, by any one or a combination of the following procedures: (a) using binders which exert an acidic or buffering effect; (b) using other pH modifying additions in the glass particle mixture; or (c) using foaming agents other than $CaCO_3$ which produce less alkaline by-products during foaming. However, procedures including use of lignosulfonate are preferred and highly advantageous in producing a pH neutral foamed glass article for stone-washing purposes.

Thus in a preferred embodiment of the invention, pulverized glass particles and a suitable binder are mixed with water and lignosulfonate, formed into an individual unit or article, heated to a first elevated temperature less than the foaming temperature for a time sufficient to remove substantially all moisture and excess organic material from the article, heated to second elevated temperature or foaming temperature at a rate of about 50° C./minute, held at the second elevated temperature for a time sufficient to allow glass particles to fuse and substantially all foaming agent to emit respective foaming gases, then cooled in three steps, a first cooling step in which cooling is achieved as quickly as practical to prevent the glass component of the foamed glass article from devitrifying, a second cooling step in which cooling proceeds slowly to anneal the glass component, and a third cooling step in which cooling continues as quickly as possible to ambient temperature. Using as a starting mixture 95% glass, 2% bentonite and 3% lignosulfonate, a pH of about 7.2 is obtained, with a pore size, hardness and density close to that of pumice, and an attrition rate much lower than natural pumice.

The methods of producing foamed glass provided in accordance with the present invention allow for the production of foamed glass that is substantially pH neutral, stable, robust, and useful in many different applications. Useful neutral pH foamed glass articles also can be obtained by including a supplemental pH modifying additive in a mixture of glass particles, foaming agent and water. The foamed glass article provided in accordance with the present invention has an important use in the stone-washing garment industry as artificial pumice, and in other industries which require neutral pH foamed glass articles of predetermined sizes and shapes that can be mass produced and consistently obtained.

The present invention will be better understood by referring to the following detailed description of preferred embodiments.

DETAILED DESCRIPTION OF PREFERRED EMBODIMENTS

In accordance with the present invention, foamed glass is produced in a predetermined size and shape. A foamed glass article described herein generates improved stone-washing effects compared to the foamed glass described in the prior art due to the pH neutrality achieved as well as the controlled cooling process that is employed. It has been found that in the absence of such cooling controls, the resultant foamed glass tends to have high internal stress which can cause it to shatter spontaneously. Furthermore, it generally is subject to a higher attrition rate than a foamed glass article provided in accordance with the preferred embodiment of the present invention. "Attrition" refers to the wearing down of the article, and indicates the length of time that a foamed glass article or natural pumice stone may be used in the stone-washed garment industry before it is worn down to the point of being no longer usable and must be discarded.

The present invention comprises a sequence of steps for making a neutral pH foamed glass article. In a preferred method of producing an individual foamed glass article, the glass article is produced from an appropriate mixture comprising pulverized glass particles, foaming agent, binder and water. These materials are mixed in the desired proportions, and the resulting glass particle mixture is formed to create a glass article of the desired size and shape. The term "foaming agent", as used herein, refers to any material or materials which evolves gas when heated to an elevated temperature above the softening temperature of the glass, and which causes cellulation or foaming of the glass article. Preferably, the gas evolved by the foaming agent is non-toxic and non-flammable, for example, carbon dioxide ($CO_2$). The preferred foaming agent of the present invention is lignosulfonate or, in the alternative, carbon.

The term "binder", as used herein, refers to any material or compound which causes the pulverized glass and water mixture to stick or bind together when forming the glass article. Preferably, the binder comprises ball clays, bentonite clays, kaolin clays and/or sodium silicate, and various organic binders such as lignin and derivatives of lignin, polyvinyl alcohol, modified cellulosics, and various vinyl acetates. However, it will be recognized by those skilled in the art that other binders identified to approach neutrality of the foamed glass article also may be suitable.

The phrase "pH modifying additive", as used herein, refers to any material or compound which can be used in addition to the foaming agent as a pH modifier. pH modifying additives used in forming the preferred embodiments of the present invention include but are not limited to calcium sulphate, calcium carbonate, sodium hydrosulphate and sodium bisulphate.

The desired foamed glass article is produced according to but not limited to any one of the conventional forming methods, as determined largely by the particular application of the article and according to the preference of the end-user. For example, one method involves the use of a die with opposing plungers to create individual articles. The briquetting method is very similar to methods used to produce charcoal briquettes, as substantially shown in U.S. Pat. No. 5,049,333, Wolfe et al. In the extrusion method, a suitable mixture of glass, foaming agent, binder, additives and water is squeezed through a port at the end of the extrusion machine in a continuous stream, then subsequently cutting the extruded material into an individual article or articles of the desired length.

Irrespective of the article forming method used, the glass article preferably then is subjected to a foaming process in a kiln. During this process in the kiln, two important heating steps occur. In the first such step, the glass article preferably is heated to a first elevated temperature and for a time to dry the article and reduce or burn out most of the organic components employed for ease of formation. This elimination of moisture and organic components prevents the formation of steam and excessive gases during the second elevated heating and foaming steps which might prevent the foamed glass article from forming correctly.

After the glass article is substantially completely dried and organic components substantially burned out in the first heating step, further heating then preferably is applied in a second heating step. The second heating step involves elevating the temperature to which the glass article is exposed until the foaming or second elevated temperature is attained. The elevated temperature reached in the second heating step causes the foaming agent, for example, lignosulfonate, to decompose completely and release the foaming gas. Lignosulfonate reduces alkalinity in a foamed glass article compared to $CaCO_3$, the most commonly used foaming agent. In the case of $CaCO_3$, the decomposition product is CaO, which is very alkaline and causes the final foamed glass article to be higher in alkalinity than desired. Lignosulfonate, the preferred foaming agent, does not release alkaline agents such as CaO after foaming.

In the preferred embodiment of the invention, glass particles are first pulverized. The glass particles can comprise many types of waste glass including, for example, clear or mixed-color container glass, window glass, plate glass, as well as new glass. Preferably, the glass particles are pulverized to obtain substantially fine mesh particles, for example, about 300 mesh.

The fine mesh pulverized glass particles then are mixed with a sufficient amount of binder, foaming agent and water to form the glass article. Generally, the foaming agent is substantially free of $CaCO_3$. In accordance with a preferred embodiment of the present invention, the foaming agent is lignosulfonate. If an alkali earth carbonate is used, for example, calcium carbonate ($CaCO_3$), it decomposes into calcium oxide (CaO) and carbon dioxide ($CO_2$). However, as mentioned above non-alkaline or less alkaline foaming agents are used in preference to $CaCO_3$, such as carbon, calcium sulphate or preferably lignosulfonate which leave lower pH by-products after foaming.

The preferred composition of foamed glass preferably is from about 0.25% to about 6% by weight lignosulfonate, about 6% by weight binder, and the remainder percent weight being pulverized glass. When $CaCO_3$ is used as a pH adjusting additive it is preferred to reduce the percentage of $CaCO_3$ to 5% or less to reduce the alkalinity and maintain a pH within the needed range for the final foamed glass article and, preferably, within the range of about 0.01% to about 5% by weight total composition. This mixture preferably is moistened with water to about 20% or less of the total weight of the mixture, depending on the article-forming method and the type and amount of binder used.

When compositions comprising lignosulfonate and $CaCO_3$ are employed, lignosulfonate is present in amounts from about 0.25% to about 6% by weight and $CaCO_3$ is present in amounts from about 0.01% by weight to less than 5% by weight and, preferably, from 0.15% by weight to 2% by weight.

In one useful embodiment, bentonite clay is used as the binder. It has also been found that increasing the amount of bentonite clay to about double the 6% or to about 12% also forms a satisfactory foamed glass article while reducing the pH about 0.5 points. Preferably, the binder is more acidic than the other materials in the foamed glass to buffer alkalinity. Even more preferably, to neutralize pH in the foamed glass, supplemental pH modifying additives such as sodium metasulfate or phosphoric acid can be added to reduce the alkalinity of the foamed glass article mixture.

After preparing the mixture of glass particles, binder, foaming agent, water, and, optionally, one or more pH modifying additives such as sodium metasulfate, the glass article may be produced according to any conventional forming method. This enables the selection of a desired size and shape for the resultant foamed glass article.

After the glass article is formed and produced by any of the conventional article forming methods, it preferably is loaded into a kiln or furnace for firing to produce the finished foamed glass article. The glass article is conveyed through the kiln for removal of moisture and excess organic materials. The temperature in the kiln rises to a first elevated temperature in the range of about 250° C. to about 700° C. and, preferably, about 375° C. The glass article remains heated for a first elevated temperature soak time of about 5 minutes to about 180 minutes and, preferably, for about 75 minutes. While in the kiln, the glass article becomes substantially completely devoid of all moisture and excess organic material.

After moisture and excess organic material have been removed, the glass article is further heated to the second elevated temperature and held at this temperature for a desired time to cause the glass particles to fuse and the foaming agent to evolve gas, thereby producing a foamed glass article. In accordance with preferred embodiments of the present invention, the glass article is heated at this stage to a second elevated temperature in the range of about 720° C. to about 860° C. at 50° C./minute and, preferably, about 775° C. for a second elevated temperature soak time in the range of about 10 minutes to about 90 minutes and, preferably, for about 30 minutes.

After heating the glass article to the foaming or second elevated temperature and holding it at that temperature for a desired time, the foamed glass article preferably is cooled to ambient temperature in a controlled manner in three cooling stages as follows:

(1) The cooling may be accomplished at a relatively rapid rate by injection of ambient air to cool the foamed article to a first cooled temperature preferably which is about 500° C.;

(2) Additional slow cooling then achieves a second cooled temperature whereby the slower cooling rate of the foamed article importantly affects the properties of the final product. Cooling of the foamed article preferably is sufficiently slow to allow for proper annealing of the foamed glass article. The second cooled temperature preferably is about 250° C.

(3) The foamed glass article then preferably is cooled rapidly wherein the foamed glass article are cooled to a third cooled temperature between the second cooled temperature and the ambient temperature surrounding the kiln.

It has been found that the foamed glass article can be cooled very rapidly by injection of large amounts of ambient air, from the foaming temperature of about 775° C. to the first cooled temperature of about 500° C. to avoid devitrification of the foamed glass. From about 500° C. to the second cooled temperature of 250° C., the cooling rate must be slow and controlled to reduce internal stresses. From the 250° C. to the third cooled temperature approaching or about ambient temperature, cooling proceeds as rapidly as possible without causing thermal deterioration or destruction of the integrity of the foamed glass article.

When the cooling process is completed, the foamed glass article is taken out of the kiln. The resulting foamed glass article will have different dimensions depending on the dimensions of the glass article before foaming, and will have a shape that varies according to the desired application. The foamed glass article generally is larger than the glass article before foaming and, generally, is about 1½ to 3 inches in diameter and about 2 to about 4 inches in length. However, it will be apparent to those skilled in the art that the foamed glass of the present invention can be produced in any size or shape desired.

The following prophetic examples are conducive to understanding the characteristics of foamed glass provided in accordance with the present invention and the methods of making the same:

EXAMPLE 1

A mixture is formed by adding together 95% by weight finely pulverized glass, 3% by weight lignosulfonate, 2% by weight bentonite clay binder. Up to 20% by weight total composition of water is added to the mixture, which amount varies depending on the forming method implemented. The glass particle mixture then is formed into a unit shape using one of the conventional forming methods known. A preferred dimension of the glass article is about 1" to about 1½" in diameter, to about 1½" to 2½" in length.

The article then is placed in a kiln. Once in the kiln, the temperature is increased gradually from about ambient temperature to a first elevated temperature of about 375° C., and the article is held at this temperature for heating for about 75 minutes. After the article has been thus heated or pre-fired, it is further heated to the foaming or second elevated temperature through increasing heat in the kiln to a temperature of about 775° C. at a rate of about 50° C./minute or more. The article is held at this temperature for about 30 minutes. During this time, the particles of glass fuse and substantially all of the remaining foaming agent decomposes to produce gas, some of which is trapped in the fused glass body. This process thereby produces a foamed glass article.

As soon as the foaming is complete, the foamed glass article remains in the kiln to be cooled in a three step process. Rapid cooling of the foamed glass article occurs by lowering the kiln temperature from the foaming or second elevated temperature until the glass article reaches the first cooled temperature, about 500° C. The foamed glass article is cooled slowly between the first cooled temperature and the second cooled temperature, about 250° C. Finally, the foamed glass article is cooled rapidly again from the second cooled temperature to the third cooled temperature. The foamed glass article then is sent out of the kiln, and can have dimensions of from about 1½" to 3" in diameter about 2"–4" in length, or any other size desired, and has a pH of 7.2 The pH was determined by adding a 1 gram finely ground sample of the completed foamed glass article to 100 cc of tap water, stirring the water with a magnetic stirring bar, inserting the pH electrodes of a pH meter into the water, and reading the pH from the meter after equilibrium, usually about 5 minutes.

EXAMPLE 2

Same as Example 1, but using 97% by weight glass, 1% by weight lignosulfonate and 2% by weight bentonite, resulting in a pH of 7.3

EXAMPLE 3

Same as Example 1 but using 98% by weight pulverized glass, 1% by weight $CaCO_3$ and 1% lignosulfonate. A pH level of 7.1 results.

EXAMPLE 4

Same as Example 1, but using 94% by weight glass, 1% by weight lignosulfonate, and 5% by weight calcium carbonate. A pH of 8.4 results.

EXAMPLE 5

Same as Example 1, but using 94% by weight glass, 1.5% by weight lignosulfonate, 1% by weight calcium carbonate and 4% by weight bentonite clay binder. A pH of 7.1 results.

EXAMPLE 6

Same as Example 1, but using 1.5% by weight lignosulfonate, 0.5% by weight calcium carbonate, 4% by weight kaolin and 94% by weight glass. A pH of about 7.2 results.

EXAMPLE 7

Same as Example 1, but using 0.5% lignosulfonate, 0.5% calcium carbonate, 4% kaolin and 95% glass. A pH of 7.3 results.

EXAMPLE 8

Same as Example 1, but the mixture consists of 6% by weight lignosulfonate and 94% by weight glass, giving a pH of 7.2.

EXAMPLE 9

Same as Example 1, but using 3% of lignosulfonate, 4% bentonite and 93% glass, giving a pH of 7.3.

EXAMPLE 10

Same as Example 1, but using 1% lignosulfonate, 4% bentonite and 95% glass, giving a pH of 7.0.

EXAMPLE 11

Same as Example 1, but using a mixture of 3% lignosulfonate, 2% kaolin, 2% bentonite and 93% glass, giving a pH of 7.3.

EXAMPLE 12

Same as Example 1, but using 97% by weight, 1% by weight lignosulfonate, 1% by weight calcium carbonate and 1% by weight calcium sulphate. A pH of 7.2 results.

EXAMPLE 13

Same as Example 1, but using 93% glass, 1% lignosulfonate, and 5% calcium sulphate. A pH of 7.2 results.

There have thus been described certain preferred embodiments of foamed glass and methods of making the same provided in accordance with the present invention. While preferred embodiments have been described and disclosed, it will be recognized by those with skill in the art that modifications which are within the true spirit and scope of the invention are intended to be covered by the claims which follow.

What is claimed is:

1. A foamed glass article formed by foaming a mixture comprising:
   glass;
   a foaming agent;
   means for controlling the pH of said article; and
   a binder;
   said article being substantially pH neutral.

2. The article of claim 1 wherein said binder is selected from the group consisting of ball clays, bentonite clays, kaolin clays, sodium silicate, lignin, polyvinyl alcohol, modified cellulosics, and vinyl acetates.

3. The article of claim 1 wherein said foaming agent is selected from the group consisting of lignosulfonate, carbon, and calcium sulphate.

4. A foamed glass article formed by foaming a mixture comprising:
   glass;
   an amount of foaming agent;
   binder; and
   a supplemental pH modifying additive;
   said article having a substantially neutral pH.

5. The article of claim 4 wherein said binder is selected from the group consisting of ball clays, bentonite clays, kaolin clays, sodium silicate, lignin, polyvinyl alcohol, modified cellulosics, and vinyl acetates.

6. The article of claim 4 wherein said foaming agent is selected from the group consisting of lignosulfonate, carbon and calcium sulphate.

7. The article of claim 4 wherein said pH modifying additive is an effective amount of an agent selected from the group consisting of calcium carbonate, calcium oxide, calcium sulphate, sodium hydrosulphate and sodium bisulphate.

8. A foamed glass article formed by foaming a mixture comprising:
   glass particles; and
   an amount of lignosulfonate; and
   means for controlling the pH of said article;
   said article having a pH in a range from about 7.0 to 8.4.

9. The article of claim 8, wherein the amount of lignosulfonate ranges from about 0.25% by weight to about 6% by weight.

10. The article of claim 8, wherein said mixture comprises from about 0.25% to about 6% by weight lignosulfonate and from about 0.01% to about 5% by weight calcium carbonate.

11. The article of claim 8, wherein said mixture comprises about 1% lignosulfonate by weight, and about 1% calcium carbonate by weight.

12. The article of claim 8, wherein said mixture consists essentially of about 3% by weight lignosulfonate, about 2% by weight bentonite and about 95% by weight glass.

13. An improved foamed glass article comprising:
    glass in the range of about 93% to about 98% by weight; and
    means for controlling pH, said means comprising lignosulfonate in the range of about 0.25% to about 6% by weight;
    said article having a pH in a range of from about 7.0 to 8.4.

14. The article of claim 13 wherein said glass comprises 94% by weight and said lignosulfonate comprises 6% by weight.

15. The article of claim 13 wherein said article further comprises a binder.

16. The article of claim 15 wherein said glass comprises 95% by weight, said lignosulfonate comprises 3% by weight, and said binder is 2% bentonite clay by weight.

17. The article of claim 15 wherein said glass comprises 97% by weight, said lignosulfonate comprises 1% by weight, and said binder is 2% bentonite clay by weight.

18. The article of claim 15 wherein said glass comprises 93% by weight, said lignosulfonate comprises 3% by weight, and said binder is 4% bentonite clay by weight.

19. The article of claim 15 wherein said glass comprises 95% by weight, said lignosulfonate comprises 1% by weight, and said binder is 4% bentonite clay by weight.

20. The article of claim 15 wherein said glass comprises 95% by weight, said lignosulfonate comprises 1% by weight, and said binder is 2% bentonite clay by weight and 2% kaolin clay by weight.

21. The article of claim 13 wherein said means further comprises a pH modifying additive.

22. The article of claim 21 wherein said glass comprises 98% by weight, said lignosulfonate comprises 1% by weight, and said pH modifying additive is 1% calcium carbonate by weight.

23. The article of claim 21 wherein said glass comprises 94% by weight, said lignosulfonate comprises 1% by weight, and said pH modifying additive is 5% calcium carbonate by weight.

24. The article of claim 21 wherein said glass comprises 93% by weight, said lignosulfonate comprises 1% by weight, and said pH modifying additive is 5% calcium sulfate by weight.

25. The article of claim 21 wherein said glass comprises 97% by weight, said lignosulfonate comprises 1% by weight, and said pH modifying additive is 1% calcium sulfate by weight and 1% calcium carbonate by weight.

26. The article of claim 13 wherein said article further comprises a binder and said means further comprises a pH modifying additive.

27. The article of claim 26 wherein said glass comprises 94% by weight, said lignosulfonate comprises 1.5% by weight, said binder is 4% bentonite clay by weight, and said pH modifying additive is 1% calcium carbonate by weight.

28. The article of claim 26 wherein said glass comprises 94% by weight, said lignosulfonate comprises 1.5% by weight, said binder is 4% kaolin clay by weight, and said pH modifying additive is 0.5% calcium carbonate by weight.

29. The article of claim 26 wherein said glass comprises 95% by weight, said lignosulfonate comprises 0.5% by weight, said binder is 4% bentonite clay by weight, and said pH modifying additive is 0.5% calcium carbonate by weight.

30. An improved foamed glass article formed by foaming a mixture comprising glass, a foaming agent, and a binder, said improvement comprising means for controlling the pH of the foamed glass article within a neutral range of about 7.0 to 8.4, said means for controlling comprising lignosulfonate in the range of about 0.25% to about 6% by weight.

31. The improvement of claim 30 wherein said means for controlling further comprising a pH modifying additive in the range of about 0.01% to 5% by weight.

32. A method of producing a substantially pH neutral foamed glass article comprising the steps of:
    (a) pulverizing glass particles and mixing with the pulverized glass particles an amount of foaming agent, binder, water, and a means for controlling the pH of the article to produce a glass particle mixture;
    (b) forming the glass particle mixture into a glass article;
    (c) heating the glass article to a first elevated temperature and for a time to substantially remove moisture and excess organic material from the glass article;

(d) further heating the glass article to a second elevated temperature and for a time to cause the glass particles to fuse and substantially all of the foaming agent to emit a foaming gas emission; and (e) cooling the glass article to produce said substantially pH neutral foamed glass article.

33. The method according to claim 32 wherein step (b) comprises pressing the glass particle mixture with a die to form glass article substantially in the shape of a cylinder.

34. The method according to claim 33 wherein said cylinder has a diameter of about 1 to about 1½ inches and a length of about 2 to about 4 inches.

35. The method according to claim 32 wherein said first elevated temperature of step (c) is in the range of about 250° C. to about 700° C. and heating occurs to remove substantially all of the moisture and excess organic material from the glass article.

36. The method according to claim 32, wherein step (c) comprises heating the glass article at about 375° C.

37. The method according to claim 32, wherein step (c) comprises heating the glass article for about 5 minutes to about 180 minutes.

38. The method according to claim 32, wherein step (c) comprises heating the glass article at about 75 minutes.

39. The method according to claim 32 wherein said second elevated temperature of step (d) is in the range of between 720° C. to about 860° C.

40. The method according to claim 32 wherein said second elevated temperature of step (d) is about 775° C.

41. The method recited in claim 32 wherein the heating applied in step (d) occurs for about 10 minutes to about 90 minutes.

42. The method recited in claim 32 wherein the heating applied in step (d) occurs for about 30 minutes.

43. The method according to claim 32 wherein the cooling step (e) comprises the steps of:

(i) cooling rapidly the glass article from the second elevated temperature to a first cooled temperature;

(ii) cooling slowly the glass article from about the first cooled temperature to a second cooled temperature;

(iii) cooling rapidly the glass article from about the second cooled temperature to a third cooled temperature.

44. The method according to claim 43 wherein the first cooled temperature is about 500° C.

45. The method according to claim 43, wherein the second cooled temperature is about 250° C.

46. The method according to claim 43, wherein the third cooled temperature is about ambient temperature.

47. The method according to claim 32 wherein step (e) is further defined by rapidly cooling of the glass article from the second elevated temperature to a first cooled temperature.

48. The method according to claim 47, wherein step (e) is further defined by slow cooling of the glass article from the first cooled temperature to a second cooled temperature.

49. The method according to claim 47 wherein step (e) is further defined by rapid cooling of the glass article from the second cooled temperature to a third cooled temperature.

50. A method of producing a substantially pH neutral foamed glass article comprising the steps of:

(a) pulverizing glass particles and foaming a glass particle mixture by mixing with the pulverized glass particle an amount of foaming agent, binder, water and a supplemental pH modifying additive in an amount effective to control pH of said particle mixture;

(b) forming the glass particle mixture into a glass article;

(c) heating the glass article to a first elevated temperature and for a time to remove moisture and excess organic materials from the glass article;

(d) further heating the glass article to a second elevated temperature and for a time to cause substantially all of the foaming agent to emit a foaming gas emission; and (e) cooling the glass article to produce said substantially pH neutral foamed glass article.

51. The method according to claim 50 wherein step (b) comprises pressing the glass particle mixture with a die to form a glass article substantially in the shape of a cylinder.

52. The method according to claim 50 wherein said cylinder has a diameter of about 1 to about 1½ inches and a length of about 2 to about 4 inches.

53. The method according to claim 50 wherein said first elevated temperature of step (c) is in the range of between 250° C. to about 700° C.

54. The method according to claim 50 wherein said first elevated temperature of step (d) is about 375° C.

55. The method recited in claim 50 wherein the heating applied in step (c) occurs for about 5 minutes to about 180 minutes.

56. The method recited in claim 50 wherein the heating applied in step (c) occurs for about 75 minutes.

57. The method according to claim 50 wherein said second elevated temperature recited in step (d) is in the range of about 720° C. to about 860° C.

58. The method according to claim 50 wherein said second elevated temperature recited in step (d) is between about 775° C.

59. The method according to claim 50 wherein said heating in step (d) occurs for a time to remove substantially all of the moisture and organic materials from the glass article.

60. The method according to claim 50 wherein said heating in step (d) occurs for about 10 minutes to about 90 minutes.

61. The method according to claim 50 wherein said heating in step (d) occurs for about 30 minutes.

62. The method according to claim 50 wherein the cooling step (e) comprises the steps of:

(i) cooling rapidly the glass article from the second elevated temperature to a first cooled temperature;

(ii) cooling slowly the glass article from about the first cooled temperature to a second cooled temperature;

(iii) cooling rapidly the glass article from about the second cooled temperature to a third cooled temperature.

63. The method according to claim 50 wherein step (e) is further defined by rapid cooling of the glass article from the second elevated temperature to a first cooled temperature.

64. The method according to claim 63, wherein step (e) is further defined by slow cooling of the glass article from the first cooled temperature to a second cooled temperature.

65. The method according to claim 63 wherein step (e) is further defined by rapid cooling of the glass article from the second cooled temperature to a third cooled temperature.

66. The method according to claim 63 wherein the first cooled temperature is about 500° C.

67. The method according to claim 63 wherein the second cooled temperature is about 250° C.

68. The method according to claim 63 wherein the third cooled temperature is about ambient temperature.

* * * * *

UNITED STATES PATENT AND TRADEMARK OFFICE
CERTIFICATE OF CORRECTION

PATENT NO. : 5,928,773
DATED : July 27, 1999
INVENTOR(S) : Andersen

It is certified that error appears in the above-identified patent and that said Letters Patent is hereby corrected as shown below:

In claim 52, (column 12, line 13), for proper dependency, the phrase "claim 50" should read --claim 51--.

Signed and Sealed this

Seventh Day of December, 1999

Attest:

Attesting Officer

Q. TODD DICKINSON

Acting Commissioner of Patents and Trademarks